(12) United States Patent
Schultink et al.

(10) Patent No.: US 8,070,858 B2
(45) Date of Patent: Dec. 6, 2011

(54) FILTER BAG FOR A VACUUM CLEANER AND USE THEREOF

(75) Inventors: Jan Schultink, Overpelt (BE); Ralf Sauer, Overpelt (BE)

(73) Assignee: Eurofilters N.V., Overpelt (BE)

( * ) Notice: Subject to any disclaimer, the term of this patent is extended or adjusted under 35 U.S.C. 154(b) by 673 days.

(21) Appl. No.: 12/096,994

(22) PCT Filed: Dec. 8, 2006

(86) PCT No.: PCT/EP2006/011842
§ 371 (c)(1),
(2), (4) Date: Sep. 11, 2008

(87) PCT Pub. No.: WO2007/068408
PCT Pub. Date: Jun. 21, 2007

(65) Prior Publication Data
US 2009/0031683 A1 Feb. 5, 2009

(30) Foreign Application Priority Data

Dec. 12, 2005 (DE) .......................... 10 2005 059 214
Sep. 1, 2006 (EP) ...................... 06018324

(51) Int. Cl.
*B01D 46/02* (2006.01)

(52) U.S. Cl. ........... 95/287; 55/382; 55/486; 55/DIG. 2; 15/347; 15/DIG. 8

(58) Field of Classification Search ................... 55/382, 55/381, 361, 486, 522, 524, 527, DIG. 2, 55/DIG. 39; 428/36.1; 15/347, DIG. 8; 95/273, 95/287; 156/64, 73.1, 73.5
See application file for complete search history.

(56) References Cited

U.S. PATENT DOCUMENTS

| | | | |
|---|---|---|---|
| 4,589,894 A | 5/1986 | Gin et al. | |
| 5,419,953 A | 5/1995 | Chapman | |
| 5,647,881 A * | 7/1997 | Zhang et al. | 55/382 |
| 6,156,086 A * | 12/2000 | Zhang | 55/382 |
| 6,193,773 B1 * | 2/2001 | Schlor et al. | 55/382 |
| 6,669,761 B2 | 12/2003 | Schultheiss et al. | |
| 6,966,939 B2 * | 11/2005 | Rammig et al. | 55/486 |
| 2007/0175190 A1 * | 8/2007 | Schultink | 55/467 |
| 2009/0056548 A1 * | 3/2009 | Woo et al. | 95/287 |

FOREIGN PATENT DOCUMENTS

| | | |
|---|---|---|
| CA | 2 276 647 | 1/2000 |
| DE | 38 12 849 | 10/1989 |
| DE | 195 44 790 | 6/1997 |

(Continued)

OTHER PUBLICATIONS

Batra et al., "The Nonwoven Fabrics Handbook", Association of the Nonwoven Fabric Industry, 1992, pp. 45-58.

(Continued)

*Primary Examiner* — Duane Smith
*Assistant Examiner* — Minh-Chau Pham
(74) *Attorney, Agent, or Firm* — Fay Kaplun & Marcin, LLP

(57) ABSTRACT

A filter bag for a vacuum cleaner includes at least three layers, at least two layers which include at least one nonwoven fabric layer and one nonwoven fibre layer being connected by a weld, a high bulk resulting due to the small number of welds per surface area.

37 Claims, 10 Drawing Sheets

FOREIGN PATENT DOCUMENTS

| | | |
|---|---|---|
| DE | 197 31 860 | 1/1999 |
| DE | 198 32 611 | 2/2000 |
| DE | 199 27 785 | 12/2000 |
| DE | 103 10 435 | 6/2004 |
| DE | 299 24 781 | 9/2005 |
| DE | 20 2005 018 003 | 2/2006 |
| EP | 0 564 799 | 10/1993 |
| EP | 0 974 387 | 1/2000 |
| EP | 0 854 943 | 12/2001 |
| EP | 1 197 252 | 4/2002 |
| EP | 1 254 693 | 11/2002 |
| EP | 1 317 949 | 6/2003 |
| EP | 0 960 645 | 8/2003 |
| EP | 1 236 494 | 10/2003 |
| EP | 1 258 277 | 11/2003 |
| EP | 1 362 627 | 11/2003 |
| WO | 01/11119 | 2/2001 |

OTHER PUBLICATIONS

Albrecht et al., "Vliesstoffe", 2000, pp. 363-399, ISBN 3-52729535-6.

Ungricht Walzen and Gravurtechnologie, "Gravure-Drawing Design No. U4156", Jan. 14, 2005, 1 sheet.

Jena et al., "A Novel Technique for Pore Structure Characterization Without the Use of Any Toxic Material", Nondestructive Characterization Materials XI, publ. Springer-Verlag, 2002, pp. 813-821.

Gupta et al., "Substitution of Alcohol in Porometers for Bubble Point Determination", Advances in filtration and separation technology, American Filtration and Separation Society, 1999, 13b, pp. 833-844.

Jena et al., "Characterization of Pore Structure of Filtration Media," Porous Materials, Inc., 36 pages, 2001.

* cited by examiner

Fig. 10

Table 1

| | Single layers | | | | Composite | | | | |
|---|---|---|---|---|---|---|---|---|---|
| | Spun-bonded fabric | Nonwoven fibre | Meltblown | Spun-bonded fabric | Mass surface density [g/m²] | Thickness [mm] | Bulk [cm³/g] | Density by volume [g/cm³] | Figure no. |
| | Mass surface density [g/m²] | | | | | | | | |
| Example 1 nonwoven fibre 100% split fibre 0.2 welds/cm² | 17 | 49 | 24 | 25 | 115 | 3.07 | 26.73 | 0.0374 | 3 |
| Example 2 nonwoven fibre 100% split fibre 0.2 welds/cm² | 17 | 72 | 24 | 25 | 138 | 3.97 | 28.73 | 0.0348 | 3 |
| Example 3 nonwoven fibre 100% split fibre 0.2 welds/cm² | 17 | 91 | 24 | 25 | 157 | 5.25 | 33.43 | 0.0299 | 3 |
| Example 4 nonwoven fibre 100% split fibre 0.2 welds/cm² | 17 | 48 | | | 65 | 2.86 | 44.03 | 0.0227 | 1 |
| Example 5 nonwoven fibre 100% split fibre 0.2 welds/cm² | 17 | 75 | | | 92 | 4.04 | 43.86 | 0.0228 | 1 |
| Example 6 nonwoven fibre 100% split fibre 0.2 welds/cm² | 17 | 98 | | | 115 | 5.75 | 50.00 | 0.0200 | 1 |
| Example 7 nonwoven fibre 100% split fibre 0.2 welds/cm² | 17 | 104 | | 17 | 138 | 6.04 | 43.80 | 0.0228 | 4 |
| Comparative example 1 nonwoven fibre 100% split fibre 2.5 welds/cm² | 17 | 49 | 24 | 25 | 115 | 2.59 | 22.51 | 0.0444 | |
| Comparative example 2 nonwoven fibre 100% split fibre 2.5 welds/cm² | 17 | 72 | 24 | 25 | 138 | 2.90 | 21.02 | 0.0476 | |
| Comparative example 3 nonwoven fibre 100% split fibre 2.5 welds/cm² | 17 | 91 | 24 | 25 | 157 | 3.64 | 23.18 | 0.0431 | |
| Comparative example 4 nonwoven fibre 100% split fibre 2.5 welds/cm² | 17 | 48 | | | 65 | 2.41 | 37.09 | 0.0270 | |
| Comparative example 5 nonwoven fibre 100% split fibre 2.5 welds/cm² | 17 | 75 | | | 92 | 3.10 | 33.73 | 0.0296 | |
| Comparative example 6 nonwoven fibre 100% split fibre 2.5 welds/cm² | 17 | 98 | | | 115 | 3.77 | 32.77 | 0.0305 | |
| Comparative example 7 nonwoven fibre 100% split fibre 2.5 welds/cm² | 17 | 104 | | 17 | 138 | 3.49 | 25.27 | 0.0396 | |

Fig. 11

Table 2

| | Example 1
Nonwoven fibre 100% split fibre
0.2 welds/cm² | Comparative example 1
Nonwoven fibre 100% split fibre
2.5 welds/cm² | |
|---|---|---|---|
| Areal weight [g/m²] | Thickness [mm] | | Δ thickness [%] |
| 114,9 | 3,1 | 2,6 | 16 |

Table 3

| | Example 2
Nonwoven fibre 100% split fibre
0.2 welds/cm² | Comparative example 2
Nonwoven fibre 100% split fibre
2.5 welds/cm² | |
|---|---|---|---|
| Areal weight [g/m²] | Thickness [mm] | | Δ thickness [%] |
| 138,5 | 4,0 | 2,9 | 27 |

Table 4

| | Example 3
Nonwoven fibre 100% split fibre
0.2 welds/cm² | Comparative example 3
Nonwoven fibre 100% split fibre
2.5 welds/cm² | |
|---|---|---|---|
| Areal weight [g/m²] | Thickness [mm] | | Δ thickness [%] |
| 156,9 | 5,3 | 3,6 | 31 |

Table 5

| | Example 4
Nonwoven fibre 100% split fibre
0.2 welds/cm² | Comparative example 4
Nonwoven fibre 100% split fibre
2.5 welds/cm² | |
|---|---|---|---|
| Areal weight [g/m²] | Thickness [mm] | | Δ thickness [%] |
| 65,4 | 2,9 | 2,4 | 16 |

Fig. 12

Table 6

| | Example 5 Nonwoven fibre 100% split fibre 0.2 welds/cm² | Comparative example 5 Nonwoven fibre 100% split fibre 2.5 welds/cm² | |
|---|---|---|---|
| Areal weight [g/m²] | Thickness [mm] | | Δ thickness [%] |
| 91,9 | 4,0 | 3,1 | 23 |

Table 7

| | Example 6 Nonwoven fibre 100% split fibre 0.2 welds/cm² | Comparative example 6 Nonwoven fibre 100% split fibre 2.5 welds/cm² | |
|---|---|---|---|
| Areal weight [g/m²] | Thickness [mm] | | Δ thickness [%] |
| 115,1 | 5,8 | 3,8 | 34 |

Table 8

| | Example 7 Nonwoven fibre 100% split fibre 0.2 welds/cm² | Comparative example 7 Nonwoven fibre 100% split fibre 2.5 welds/cm² | |
|---|---|---|---|
| Areal weight [g/m²] | Thickness [mm] | | Δ thickness [%] |
| 137,5 | 6,0 | 3,5 | 42 |

Fig. 17:

Table 9

| Welds/100 cm² | Average total porosity [%] | Average median of pore diameter [μm] |
|---|---|---|
| 16 | 96,8 | 201,8 |
| 70 | 83,5 | 160,8 |
| 95 | 67,4 | 129,1 |

FILTER BAG FOR A VACUUM CLEANER AND USE THEREOF

FIELD OF INVENTION

The present invention relates to a filter bag for a vacuum cleaner comprising at least three layers, at least two layers which comprise at least one nonwoven fabric layer and a nonwoven fibre layer are connected by a weld, a high bulk resulting due to the small number of welds per surface area. The invention relates furthermore to the use of a filter bag of this type.

BACKGROUND INFORMATION

In the last few years, numerous developments have become known which deal with improving the mono- or multilayer filter bags made of paper or paper and tissue which have been known for a long time in the state of the art. DE 3 812 849 describes dust filter bags with a filter paper outer layer and an internally situated melt-spun microfibre nonwoven fabric (melt-blown). A multilayer filter bag made of nonwovens (SMS) is disclosed for example in U.S. Pat. No. 4,589,894 and U.S. Pat. No. 5,647,881. These inventions deal mainly with improving the dust separation. In EP 1 258 277 B1 and EP 0 960 645 B1, combinations of nonwovens are described which have a particularly long service life and good dust separation capacity. EP 1 362 627 A1 describes filter bags with a multilayer construction in which the fibre diameter distributions in the coarse dust filter layer and in the fine dust filter layer have gradients. In EP 1 254 693 A2, a vacuum cleaner bag is described in which a pre-filter layer made of a dry-laid, electrostatically effective nonwoven is present in front of a filter layer.

Furthermore, a filter medium made of a film fibre nonwoven is described in EP 1 197 252 A1, which comprises dry-laid, electrostatically charged split fibres which are connected to each other by ultrasonic welding. In order to achieve sufficient strength of the nonwoven, it is essential that at least two ultrasonic weld points per $cm^2$ are present. It is achieved as a result that the individual fibres are connected directly to each other by ultrasonic welds. It is mentioned as an advantage of such a filter medium that the manufacturing rate in comparison with needle bonding of the fibre web with a scrim is higher and the air resistance of the scrim can be avoided. In the above-mentioned application, it is also provided furthermore that the film fibre nonwoven can also be connected to further nonwoven fabric layers. It is disadvantageous with the filter medium of EP 1 197 252 A1 above all that the dust storage capacity of this material is inadequate for use as filter medium for vacuum cleaner bags.

SUMMARY OF INVENTION

The present invention relates to a filter.

Starting herefrom, it is the object of the present invention to indicate a filter bag, the filter material of which, in comparison with those described in the state of the art, has a particularly low bulk density in order to achieve a superior dust storage capacity. The filter bag is intended in addition to have a construction in which the structure and hence the associated advantageous properties of the non-compacted fibre layer are retained as extensively as possible.

According to the invention, a filter bag for a vacuum cleaner with a filter material is proposed, which bag is distinguished in particular in that it has a construction comprising at least three layers, at least two layers, which comprise at least one nonwoven fabric layer and at least one nonwoven fibre layer, are connected by welds, the operation in the case of the welds taking place with as few as possible welds relative to the total permeable surface area of the filter bag. According to the present invention, this is achieved in that, relative to the total permeable surface area of the filter bag, on average at most 19 welds per 10 $cm^2$ are present, preferably at most 10 welds and particularly preferred at most 5 welds. The compressed surface area proportion of the weld pattern is thereby at most 5%, preferably at most 2% and particularly preferred at most 1% of the permeable surface area of the filter bag.

In an advantageous embodiment, the filter bag has the additional feature that the average total porosity is at least 65%, preferably at least 80%, very particularly preferred at least 95%.

In a further advantageous embodiment, the average median of the pore diameter is at least 120 μm, further preferred at least 150 μm, further preferred at least 180 μm and very particularly preferred at least 200 μm.

The measuring method for determining the average total porosity or the average median of the pore diameter according to the present invention is described in more detail with reference to FIGS. 15 to 17.

As a result of the fact that a low number of welds is now present, in comparison with the filter material according to EP 1 197 252 A1, the thickness and hence bulk of the material is significantly increased with the same mass surface density. As a result of the low bulk density of the composite, the material has a high dust storage capacity.

With respect to the geometry, i.e. the distribution of the welds on the permeable surface area of the filter bag, the present invention is subject to no restrictions with the proviso that at most 19 welds per 10 $cm^2$ are present, relative to the permeable surface area of the filter bag. The welds can thereby basically be distributed uniformly, i.e. at the same spacings, over the entire surface area, or else also be non-uniform. The invention hence also comprises embodiments in which welds are present in a higher number only in specific regions and in which then larger free surface areas are produced which are then separated again by an increased number of welds from a next larger free surface area. It is always an essential criterion that the maximum number of welds indicated in claim 1 is not exceeded. The welds themselves can thereby be configured in different geometries. Thus punctiform, linear, star-shaped or even bar-shaped welds can be used. With respect to the precise configuration of the welds, in addition to the number of welds as limiting criterion, solely the compressed surface proportion of the weld pattern must also be taken into account which, as stated initially already, is at most 5%, preferably at most 2% and particularly preferred merely at most 1%.

From the point of view of materials, the nonwoven fibre layer of the invention, which is present in a composite with the nonwoven fabric layer, comprises all the staple fibres and/or filaments which are known per se in the state of the art. There are understood by staple fibres in the sense of the invention also split film fibres and crimped fibres, the staple fibres in the sense of the invention can thereby also preferably be electrostatically charged.

As crimped fibres, those have proved to be particularly favourable which have a spatial structure, such as e.g. a zig-zag, undulating and/or a spiral structure. The advantage of such fibres is that they can increase the bulk of the medium significantly more.

The crimped fibre can thereby be a mechanically crimped, an autocrimped fibre and/or a bicomponent crimped fibre.

Autocrimped fibres are described for example in the EP patent 0 854 943 and also in PCT/GB 00/02998. Bicomponent crimped fibres are obtainable for example via Chisso Corporation in Japan and crimped polyester staple fibres of the spiral type at Gepeco in the USA.

In the invention, staple fibres which are selected from natural fibres and/or chemical fibres can be used. Examples of chemical fibres are in particular polyolefins and polyesters. Examples of natural fibres are cellulose, wood fibres, kapok, flax.

The nonwoven fibre layer of the invention thereby comprises loosely-laid fibres or filaments. The methods for laying are known from the state of the art for nonwoven fabrics. In the nonwoven fabric production, the main process steps, raw material treatment→web formation→web compaction→nonwoven fabric finishing are thereby implemented. The loose, still non-bonded fibrous web produced during nonwoven formation is thereby termed web (see Nonwoven fabrics, W. Albrecht, H. Fuchs, W. Kittelmann, Wiley-VCH, 2000). As a result of the web-binding step, the nonwoven fabric is produced from the fibrous web and has sufficient strength in order to be wound into rolls for example. This last-mentioned step is hence not effected during the production of the nonwoven fibre layer according to the invention, instead, the nonwoven fibre is bonded to a nonwoven fabric layer.

The filter bag according to the invention, with respect to the arrangement of the layers and the number of layers is subject so far to no restrictions with the proviso that respectively at least two layers comprise one nonwoven fabric layer and at least one nonwoven fibre layer, these two layers being connected to each other right through by a weld, preferably by an ultrasonic weld, as described above. The nonwoven fabric layer of the above-described composite is thereby preferably a support or carrier layer and has a mass surface density of at least 5 g/m$^2$. A scrim is used conveniently as nonwoven fabric layer itself. There is understood thereby by scrim any air-permeable material which can serve as carrier- or reinforcing layer. It can be a nonwoven fabric, a woven material or netting. Preferably, it comprises a thermoplastic polymer in order to facilitate the weldability to the nonwoven fibre layer. Examples of scrims are spun-bonded fabrics. However, they can also be dry or wet-laid nonwovens which have sufficient mechanical stability. The mass surface density of a nonwoven fabric layer of this type is, according to the present invention, preferably between 10 and 200 g/m$^2$, particularly preferred between 20 to 100 g/m$^2$. The mass surface density in g/m$^2$ was thereby determined according to DIN EN 29073-1. It should be mentioned with respect to the mass surface density of the nonwoven fibre layer that this was determined indirectly via the composite comprising nonwoven fabric layer and nonwoven fibre layer since the determination of the mass surface density of the nonwoven fibre layer alone is not possible because of its loose structure. The determination was therefore effected by a subtraction method, i.e. the mass surface density of the total composite, i.e. of the composite comprising nonwoven fabric layer and nonwoven fibre layer, was determined and then the mass surface density of the nonwoven fabric layer, which can be determined separately, is subtracted again.

The thickness of the above-described composite comprising nonwoven fabric layer and nonwoven fibre layer is between 1 and 7 mm, preferably between 2 and 4 mm. Determination of the thickness was thereby effected according to EDANA 30.5-99 pt. 4.2. A VDM 01 was thereby used as appliance, obtainable at Karl Schröder KG in Weinheim. Since the measurements according to methods 4.1, 4.2 or 4.3 led to very different results, the measurements of the composites according to the invention, i.e. composites, were implemented in principle according to method 4.2.

The filter bag according to the invention can of course, as described above, have further layers apart from the composite comprising nonwoven fabric layer and nonwoven fibre layer. Thus a filter bag according to the invention can be constructed for example from three layers, the nonwoven fibre layer here then being enclosed between two nonwoven fabric layers in the manner of a sandwich, which then act as a support or carrier layer. The filter bag according to the invention can have in addition, according to requirements, also further fine filter layers with different filter properties. Fine filter spun-bonded layers are hereby used as fine filter layers. Fine filter spun-bonded layers in the sense of the invention are corresponding layers which are suitable for separating fine particles. Conventional fine fibre spun-bonded fabrics are produced according to the spun-bonded melt-blowing process, the spun-bonding flash spinning process or electrostatic spun-bonding. Reference is made with respect to the content to the book Nonwoven Fabrics by W. Albrecht, H. Fuchs, W. Kittelmann, Wiley-VCH 2000, chapter 4. In the sense of the invention, fine filter layers can however also comprise dry-laid nonwoven fabrics comprising electrostatically charged fibres.

The filter bag according to the invention is thereby preferably connected together by a continuous ultrasonic weld through all the layers, i.e. through the nonwoven fabric layer and the nonwoven fibre layer and also the further layers. The filter bag according to the invention comprises however also embodiments in which merely welds of the nonwoven fabric layer with the nonwoven fibre layer are present and the further layers are connected either by gluing or by a further connection process with the composite comprising nonwoven fabric layer and nonwoven fibre layer. The invention also comprises embodiments, for example in the form of a three-layer structure, the further layer then being situated merely loosely on the composite on the nonwoven fibre layer and the nonwoven fabric layer, and an edge-side connection alone being implemented.

The filter bag according to the invention is suitable in particular as dust filter bag.

BRIEF DESCRIPTION OF DRAWINGS

The invention is explained subsequently in more detail with reference to FIGS. 1 to 14.

FIGS. 10 - 12 show tables including measuring results achieved by means of the embodiments according to FIGS. 1, 3 and 4.

FIG. 17 shows a table reproducing the measuring values with respect to the average total porosity and the median of the pore diameter.

DETAILED DESCRIPTION

Figure 1:
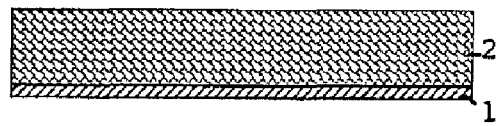
FIGS. 1 to 9 show schematically in sections how the filter material of the filter bag according to the invention can be constructed.

FIG. 1 thereby shows a two-layer construction comprising a layer 1 in the form of a nonwoven fabric layer which is a scrim in FIG. 1. This scrim layer 1 is connected to a nonwoven fibre layer 2 by ultrasonic welds. In FIG. 1, the further layer required according to the invention is not illustrated.

Figure 2:
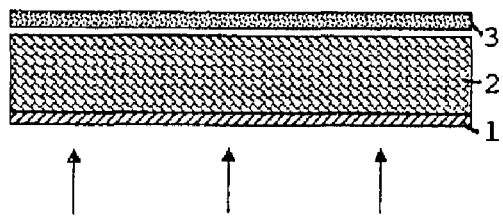

The structure of the construction of the embodiment represented in FIG. 2 essentially corresponds to that of FIG. 1 but with an additional layer of a fine filter medium 3 which here represents the third layer. The preferred inflow side is characterised by arrows. The fine filter layer 3 thereby comprises for example a melt-blown nonwoven fabric.

Figure 3:
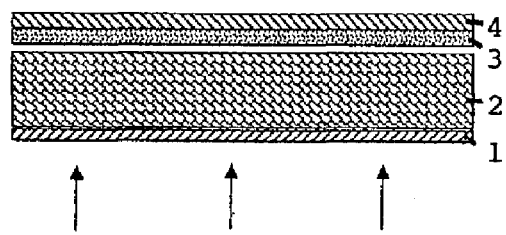

FIG. 3 shows in turn a further example, starting from FIG. 2, with an additional protective layer 4 which is disposed here on the outflow side. This protective layer 4 can be a scrim, preferably a spun-bonded fabric.

Figure 4:
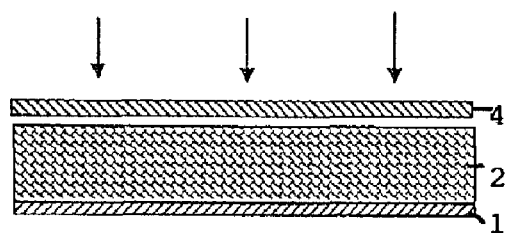

The embodiment which is shown in FIG. 4 is connected from a layer of a nonwoven fabric 1 to a nonwoven fibre layer 2 which is fixed thereon by means of welding as described above, in addition here also a layer of a protective nonwoven fabric 4 being connected in front on the inflow side. The nonwoven fabric 1 is hereby in particular a melt-blown nonwoven fabric.

Figure 5:
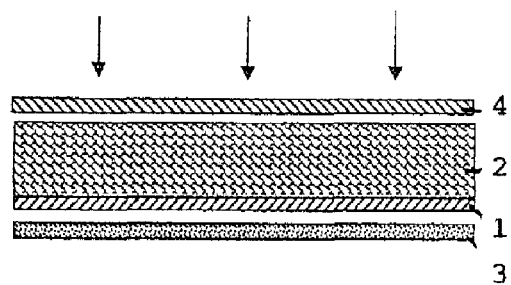

FIG. 5 differs from FIG. 4 by an additional microfibre nonwoven layer 3 which is disposed on the outflow side.

Figure 6:
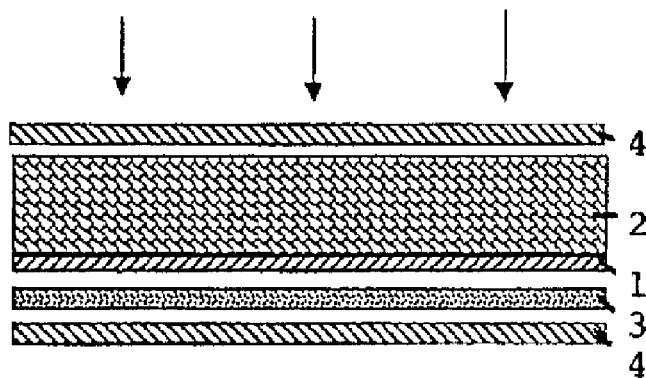

The example of the structure according to the invention which is shown in FIG. 6 starts from the construction according to FIG. 5 but then has an additional protective layer 4 here on the outflow side.

Figure 7:
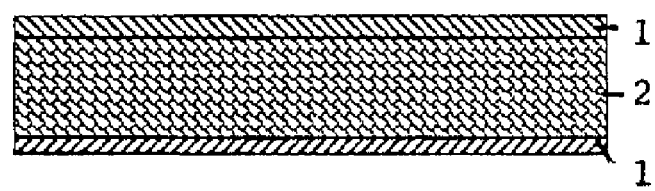

FIG. 7 now shows a laminate comprising 2 layers of nonwoven fabric 1 which are connected to each other by ultrasonic weld points and between which the nonwoven fibre layer 2 is situated.

Figure 8:
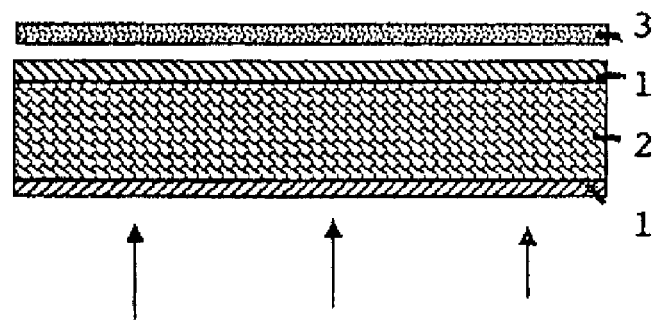

FIG. 8 describes an embodiment of the structure according to the invention which starts from FIG. 7 but here now with a layer of a filter medium 3 which is disposed on the outflow side.

Figure 9:
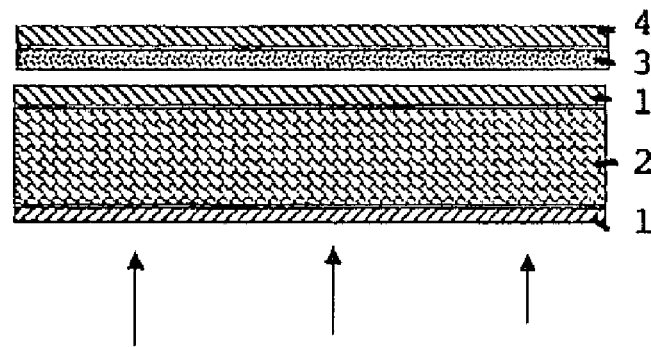

FIG. 9 shows a structure which starts from FIG. 8, with an additional layer 4 on the outflow side. In the above-described FIGS. 1 to 9, the respective constructions are merely described schematically according to the layer sequence. The above-described constructions are then preferably connected to each other by ultrasonic welds.

FIGS. 10-12 show tables including measuring results achieved by means of the embodiments according to FIGS. 1, 3 and 4.

Figure 13A:
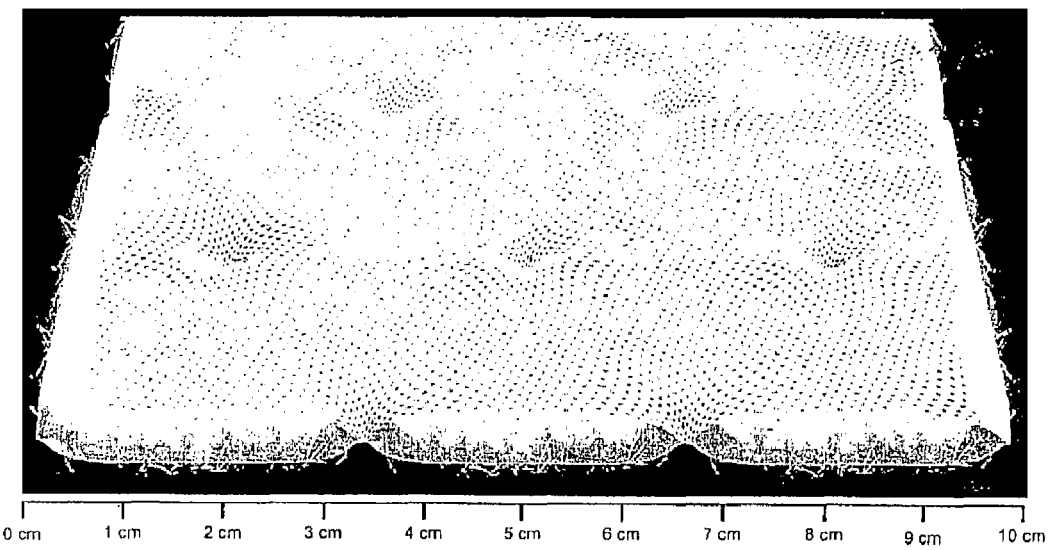
FIGS. 13*a* and 13*b* shows a 3D graphic of how a number of weld points has an effect on the structure of the material.
Figure 13B:
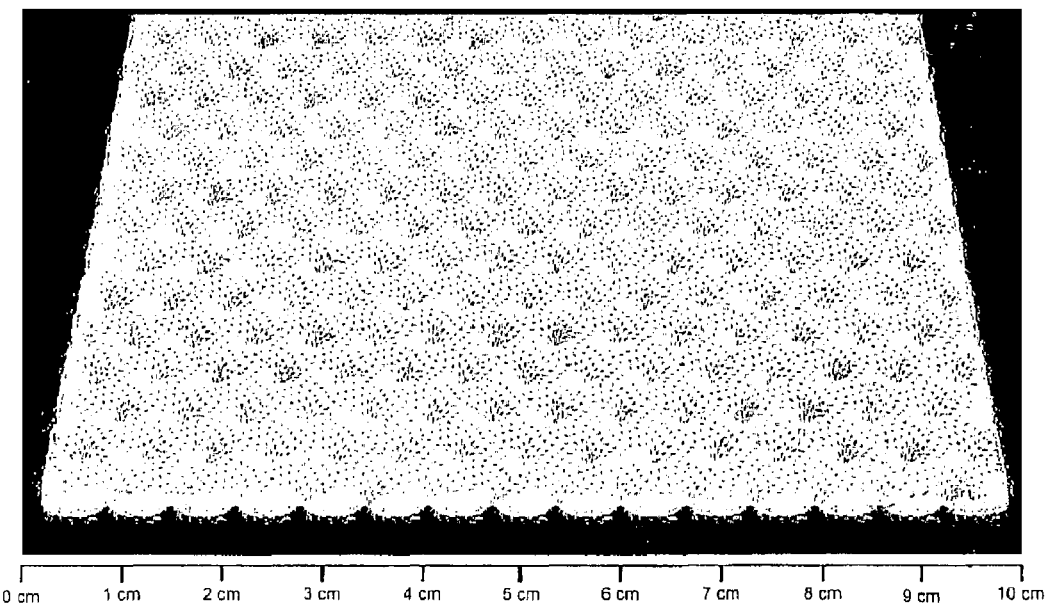

FIGS. 13a and 13b shows a 3D graphic of how a number of weld points has an effect on the structure of the material.

Figure 14:
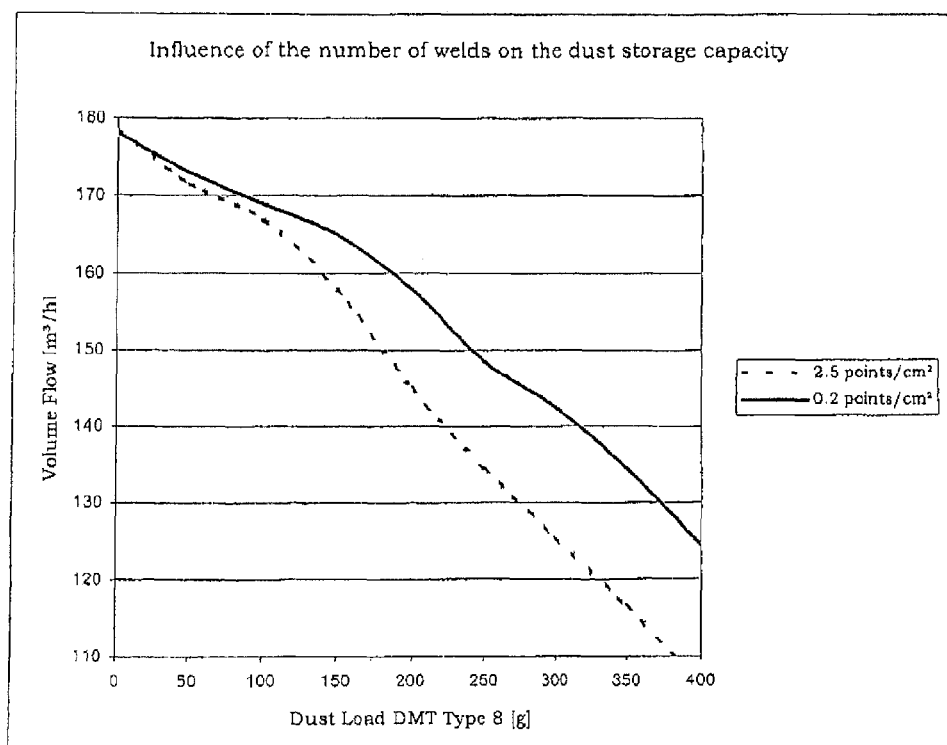
FIG. 14 shows a graph including measuring results indicating an increase in dust storage capacity relative to the filter media which are described in the state of the art.

FIG. 14 shows a graph including measuring results indicating an increase in dust storage capacity relative to the filter media which are described in the state of the art.

Figure 15:
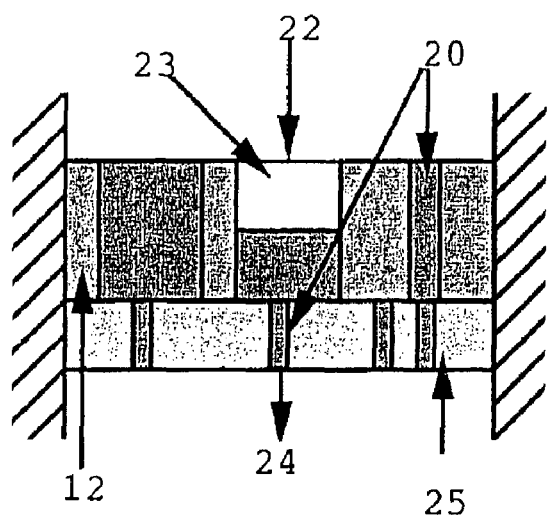
FIG. 15 shows schematically the measuring principle for determining the average total porosity and the median of the pore diameter.

FIG. 15 shows schematically the measuring principle for determining the average total porosity and the median of the pore diameter.

Figure 16:
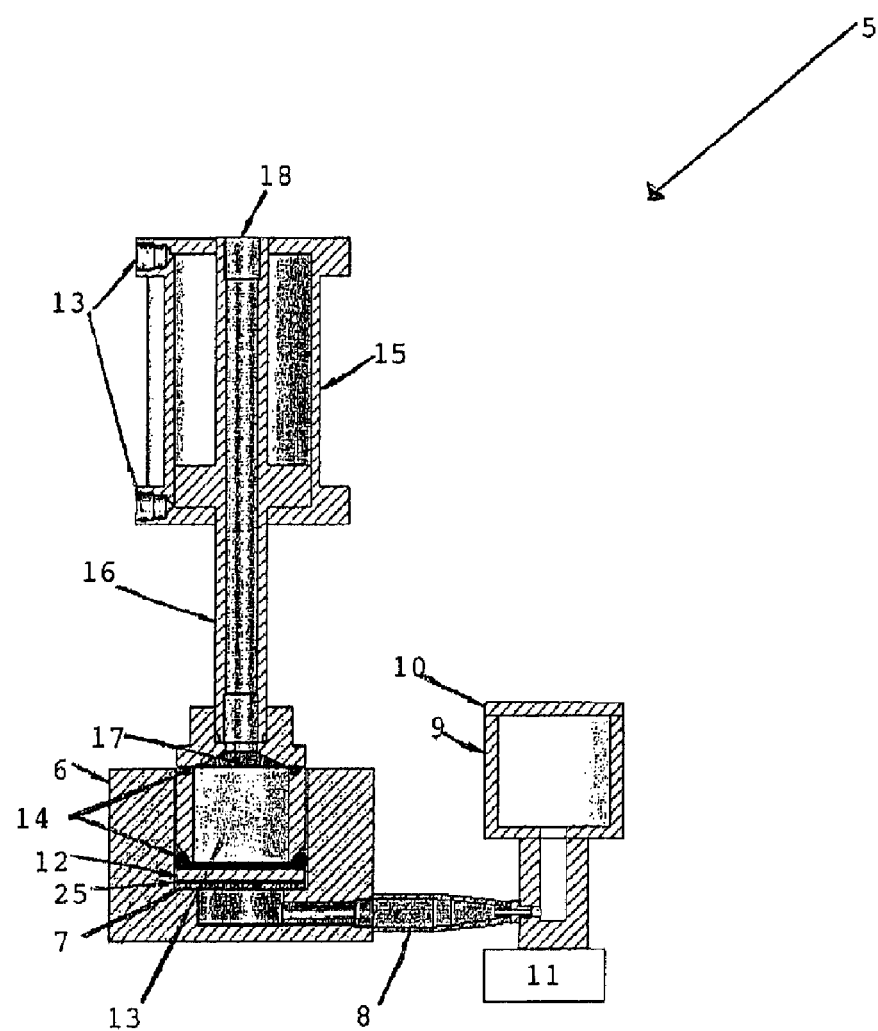
FIG. 16 shows a device which is used in the determination of the average total porosity and the median of the pore diameter.

FIG. 16 shows a device which is used in the determination of the average total porosity and the median of the pore diameter.

FIG. 17 shows a table reproducing the measuring values with respect to the average total porosity and the median of the pore diameter.

In Tables 1 to 11 (FIGS. 10 to 12), the measuring results are now compiled which were achieved by means of the embodiments, described above, according to FIGS. 1, 3 and 4, in comparison with an embodiment according to EP 1 197 252 A1. In the examples according to FIGS. 1, 3 and 4, a composite was used which has 0.2 weld points per $cm^2$. In the comparative examples, 2.5 weld points per $cm^2$ were chosen. As emerges from Tables 1 to 11, the materials according to the invention are distinguished in particular in that they are 15 to 42% thicker than the comparison materials. Reference should thereby be made in particular to the fact that this leads to the bulk of the materials according to the invention being likewise higher by a corresponding dimension, namely by 15 to 42%, than in the comparative examples. The superior effect of the materials according to the invention which hence have an above-average high dust storage capacity is based on this extremely high bulk (see also FIG. 14).

FIG. 13a now shows in the form of a 3D graphic, how the low number of weld points has an effect on the structure of the material. In FIG. 13a, a material is thereby shown as corresponds to the construction according to FIG. 7, i.e. it is a material which comprises a nonwoven fibre layer which is connected by ultrasonic welds between two layers of spun-bonded fabric. In the case of the example according to FIG. 13a, approx. 0.2 weld points per $cm^2$ were used. FIG. 13a clearly shows the cushion-like configuration which leads to the high bulk as previously described. In the case of the example according to FIG. 13a, 100% split fibres made of polypropylene were thereby used as nonwoven fibre layer. The spun-bonded fabric likewise comprises polypropylene. The construction of the filter medium represented in FIG. 13b corresponds analogously to that already described in FIG. 13a but with the difference that here 2.5 weld points per $cm^2$ are present. This makes it clear that, as a result of the configuration according to the invention in the form of a low number of welds, a significant advantage is achieved with respect to the bulk of the material.

As now represented in FIG. 14, the configuration according to the invention leads to a significant increase in dust storage capacity, relative to the filter media which are described in the state of the art and have 2.5 weld points per $cm^2$. The measuring results represented in FIG. 14 were implemented as follows:

| | |
|---|---|
| Vacuum cleaner used: | Miele performance 2300 |
| | Type: HS 05 |
| | Model: S749 |
| | No.: 71683038 |
| Performance setting: | Maximum |
| Size of filter bags: | 295 mm × 270 mm |
| Test dust: | DMT Type 8 |

Test Procedure:
the dust bag to be tested, after the appliance has been warmed-up for 10 minutes, is installed in the appliance. The volume flow without dust loading is read after 1 min. running time of the appliance. Subsequently, the first dust portion of 50 g is suctioned in within 30 seconds. After 1 min., the resulting volume flow (in $m^3/h$) is read off. This step is correspondingly repeated for the following dust additions until 400 g dust have been added.
Filter Medium:
Spun-bonded fabric 17 $g/m^2$, nonwoven fibre 50 $g/m^2$
Spun-bonded fabric 17 $g/m^2$
Welding Pattern:
1. 2.5 points/$cm^2$, uniformly distributed
2. 0.2 points/$cm^2$, uniformly distributed The measuring values reproduced in the examples were determined by the following determination methods:

Thickness:
EDANA 30.5-99 pt. 4.2, appliance: VDM 01, obtainable at Karl Schröder KG, Weinheim.

Since the measurements according to methods 4.1, 4.2 or 4.3 lead to very different results, the measurements of the laminates according to the invention were implemented in principle according to method 4.2 (for bulky nonwovens with a maximum thickness of 20 mm).

Mass Surface Density [g/cm$^2$]: DIN EN 29073-1

Bulk [cm$^3$/g]:
Thickness (EDANA 30.5-99 pt. 4.2)/mass surface density (DIN EN 29073-1)

Bulk Density [g/cm$^3$]:
Mass surface density (DIN EN 29073-1)
Thickness (EDANA 30.5-99 pt. 4.2)

In FIG. 15, the measuring principle for determining the average total porosity and the median of the pore diameter is illustrated schematically.

FIG. 16 shows a device which is used in the determination of the average total porosity and of the median of the pore diameter.

Table 9 (FIG. 17) reproduces the measuring values with respect to the average total porosity and the median of the pore diameter.

The measuring values were thereby determined according to the method indicated below.

In order to determine the average total porosity and the median of the pore diameter, the methodology of the extrusion of a wetting liquid was used. The measurements were effected by means of a PMI liquid extrusion porosimeter. Reference is made subsequently in this respect to FIGS. 15 and 16.

1. Measuring Principle

Since the free surface energy of the system of wetting liquid 20/sample 12 is less than the free surface energy of the system air/sample 12 the pores of a sample are spontaneously filled with wetting liquid 20. The wetting liquid 20 can thereby be removed from the pores by increasing the differential pressure 22 of an inert gas 18 on the sample 12. It was shown that the required differential pressure 22 for displacing the wetting liquid 20 from a pore is determined by the size of the pore (Akshaya Jena, Krishna Gupta, "Characterization of Pore Structure of Filtration Media", Fluid Particle Separation Journal, 2002, 4 (3) pp. 227-241). The correlation between the differential pressure 22 of the inert gas 18 and the pore size is reproduced by equation 1

$$p = 4\gamma \cos\theta / D \quad (1)$$

p being the differential pressure 22 of an inert gas on the sample, γ the surface tension of the wetting liquid 20, θ the contact angle of the wetting liquid 20 on the pore surface and D the pore diameter, the definition of which is reproduced for an irregular cross-section by the following equation (2)

$$D = 4(\text{cross-sectional surface})/(\text{cross-sectional circumference}) \quad (2)$$

If the sample 12 is applied on a membrane 25 and the pores of the sample 12 and of the membrane 25 are filled with a wetting liquid 20, the application of a pressure 23 on the sample 12 leads to displacement 23 of the liquid from the pores of the sample 12 and to an outflow 24 of the liquid 20 through the membrane 25. If the largest pore of the membrane 25 is smaller than the smallest pore of interest in the sample 12, the liquid 20 is in fact displaced from the pores of interest in the sample 12 and flow out of the membrane 25 but the pressure 22 will not suffice to remove the liquid 20 completely from the pores of the membrane 25, the gas will not be able to flow out through the liquid-filled pores of the membrane 25. Hence the diameter or the volume of the pores can be determined via the differential pressure 22 and the volume of the liquid 20 which has flowed out (A. Jena and K. Gupta, "A Novel Technique for Pore Structure Characterization without the Use of Any Toxic Material", Nondestructive Characterization of Materials XI, Eds.: Robert E. Green, Jr., B. Boro Djordjevic, Manfred P. Hentschel, Springer-Press, 2002, pp. 813-821).

2. Test Structure

The methodology of liquid extrusion underlies the PMI liquid-extrusion porosimeter 5 (FIG. 16). The sample chamber 6 of the porosimeter 5 thereby comprises a cylindrical PVC container, the diameter of which is 45 mm and the depth of which is 45 mm. A relatively wide-mesh, open net 7 manufactured from stainless steel wire is situated on a strip at the base of the sample chamber 6. Underneath the net 7, the sample chamber 6 is connected via a flexible hose 8 which is a few mm in diameter to the underside of a cylindrical acrylic vessel 9, the diameter of which is 40 mm and the depth of which is 40 mm. The vessel 9 and also its cover 10 are thereby placed on scales 11 (Producer: Mettler, weight resolution 0.0001 g). A cylindrical insert 13 (40 mm diameter, 40 mm height) is placed on the sample 12 within the sample chamber 6. The upper side of the insert 13 thereby has a notch for an O-ring 14. A pneumatically driven device 15, which has a piston 16 guided in a cylinder, is mounted on the sample chamber 6. The piston 16 is hollow in order to ensure a throughflow of the test gas 18 into the sample chamber 6. A flat disc 17 made of stainless steel, which is welded to the underside of the piston 16, presses the insert 13 against the O-ring 14 on the upper side of the insert 13 and thus prevents escape of test gas 18. Control of the piston 16 is effected pneumatically. The result thereby is a separate supply of the test gas 18 and of the gas 19 for operating the piston 16.

3. Wetting Liquid

In all the tests, Galwick was used as wetting liquid, a perfluorinated polymer (oxidised and polymerised 1,1,2,3,3,3-hexafluoropropene). The liquid is inert, the surface tension is 16 dynes/cm. Because of the very low surface tension of the test liquid, the contact angle is almost 0° (Vibhor Guptor and A. K. Jena, "Substitution of Alcohol in Porometers for Bubble Point Determination", Advances in Filtration and Separation Technology, American Filtration and Separation Society, 1999, 13b, pp. 833-844).

4. Test Gas

Dry and purified compressed air was used in all tests. In order to remove solid particles, the air was filtered, the moisture was removed by means of the standard drying methods known to the person skilled in the art from the state of the art.

5. Automated Test Implementation, Data Acquisition and Management

The test implementation, data acquisition and also the data reduction were implemented fully automated by the use of a computer and suitable software. The implementation of the test procedure after loading the sample chamber 6 with a sample 12 was effected automatically so that accurate and reproducible results could be obtained.

6. Test Procedure a) Preparation of the Measuring Instrument

The test chamber 6, the vessel 9 on the scales 11, the net 7 on the base of the sample chamber 6 and the insert 13 were cleaned with alcohol in order to remove impurities. The O-rings 14 were likewise cleaned and greased. A Millipore membrane 25 with a maximum pore diameter of 0.45 μm was applied on the net 7. It must thereby be ensured that the membrane 25 is undamaged, i.e. has no defects, tears or other damage since otherwise this can lead to falsification of the measuring result. Wetting liquid 20 was now placed in the vessel 9 and flows via the hose 8 into the sample chamber 6. Enough wetting liquid 20 was thereby added that a liquid level is achieved in the sample chamber 6 so that the liquid 20 covers the net 7 totally and completely. As a result, complete wetting of the membrane is ensured. After a certain time, constancy of the needle of the scales 11 resulted, from which achievement of a stationary state could be recognised.

b) Preparation of the Samples

For the measurement, filter bags were used, made of a filter bag material which comprises a composite made of a nonwoven fibre layer enclosed between 2 nonwoven fabric layers. The nonwoven fabric layers (spun-bonded layers) are formed from polypropylene fibres. The nonwoven fibre layer comprises polypropylene staple fibres (split fibres of 60 mm length). The filter material is thereby connected by punctiform welds which are introduced by means of ultrasonic welding. 3 samples were examined with a different number of weld points, namely 16, 70 and 95, relative respectively to 100 cm², which are distributed uniformly over the surface. Circular samples 20 of 45 mm in diameter were then punched out of the filter bags. The samples 12 were weighed and the thickness determined according to EDANA 30.5-99 pt. 4.2 (see in this respect p. 8, lines 3-13), evidence about the thickness being able to be made only with difficulty which can be attributed to the soft nature and the uneven surface of the sample 12. The bulk density $\rho_b$ was calculated. This bulk density corresponds to that of the dry sample. The top layer of the sample 12 was scored with a knife (Stanley knife). Each cut was 10 mm long and 1 mm wide. In order to discover an adequate number of cuts, samples 12 with a different number of cuts were examined. Based on the results which were obtained with these samples 12, it was found that five cuts per sample 12 are adequate; hence all the tests were implemented with five cuts per sample 12. The arrangement of the five cuts was thereby effected analogously to the arrangement of spots in a five on a dice.

c) Wetting and Loading of the Sample

The sample was introduced into a vessel containing wetting liquid 20. The sample 12 thereby absorbed the wetting liquid 20 and showed a tendency to swell. Care was thereby taken not to immerse the sample 12 completely in the liquid 20 in order to avoid air inclusions in the sample 12. The wetted sample 12 was applied subsequently on the membrane 25 within the sample chamber 6. The O-ring 14 was applied on the sample 12 and the insert 13 on the O-ring 14.

d) Implementation of the Tests

All the information relating to the sample 12 including the identification number was stored in a computer. The units and also the different functions to be measured were likewise input. Subsequent thereto, the test was implemented.

The piston 16 was lowered under computer control in order to press the insert 13 on the O-ring 14. In order to avoid leakages, a predetermined pressure was applied to the O-ring 14. The scales 11 were tared. Subsequently, the test gas 18 was introduced slowly by means of the piston 16 to the surface of the sample 12. The gas pressure 22 was computer-controlled, increased in small increments so that an adjustment of an equilibrium of the system was hence achieved before recording the data. The computer stored the data of the pressure and of the weight change of the liquid by means of the scales 11. The results were likewise displayed graphically in order to follow the progress of the tests. In order to obtain the results at the end of the test the data were expressed in different ways.

7. Results

The measuring device 5 recorded the increase in weight of the wetting liquid 20 which was displaced from the sample 12 via the scales 11 and recalculated the weight of the liquid 20 via the density into the corresponding volume. This result represents the cumulative pore volume. Likewise, the pore diameter was calculated from the gas pressure of the test gas 18 which was determined by the measuring device 5 and which was used to displace the wetting liquid 20 from the pores of the sample 12. Hence the cumulative pore volume could be recorded as a function of the pore diameter. The porosity P (in %) was calculated from the bulk density, $\rho_b$ and the total pore volume V according to equation (3).

$$P = (V \rho_b) \times 100 \qquad (3)$$

Via the measuring device 5, the median of the pore diameter could also be calculated. The median of the pore diameter is defined such that 50% of the total pore volume originates from pores which are larger than the average pore and 50% of the total pore volume originates from pores which are smaller than the average pore. The arithmetical mean of a plurality of measurements of the samples which were used is reproduced in Table 9 (FIG. 17). As emerges from Table 9, the filter material of the bag according to the invention has an extremely high average total porosity of up to 96.8%. With an increasing number of welds, the total porosity then drops to a value of 67.4%. Correspondingly, the average median of the pore diameter is reduced from 201.8 μm to 129.1 μm. As the results show, the filter bags according to the invention have an extremely high porosity which ultimately leads to an above-average dust storage capacity.

8. Discussion of the Measuring Method

In the case of the measuring methodology used, the pore diameter and the pore volume of a sample is calculated from the measured gas pressure which is required to displace the wetting liquid from the pores, and also from the measured volume of displaced liquid from the pores. The pores in the nonwoven fabric layers (spun-bonded layers) of the sample which are applied at the top and bottom are much smaller than the pores of the nonwoven fibre layer in the central layer. It is evident from equation 1 that the gas pressure which is required to displace a liquid from the layers applied at the top and bottom must be much higher than that required for the nonwoven fibre layer. During the investigation of the filter bags, displacement of the liquid 20 from the pores of the central nonwoven fibre layer will only be effected after the liquid from the pores of the spun-bonded layer applied at the top is effected. The high pressure which is required to displace the liquid from the small pores of the spun-bonded layer applied at the top, will likewise displace liquid from the larger pores of the central nonwoven fibre layer; hence the diameter of the small pores of the spun-bonded layer applied at the top is measured as the diameter of the pores in the nonwoven fibre layer as central layer. The specific pore volume will be close to the pore volume of the central layer since the volume of the small pores in the very thinly defined layers applied at the top and bottom is negligible, compared with the large volume of the large pores in the thick central layer.

The test procedure which was used during this examination also includes application of a plurality of cuts on the top layer.

Large openings were made in the top layer by means of the cuts so that the test gas could pass to the small pores of the top layer. No measurement of the diameter and of the volume of the small pores in the top layer was thereby effected. Hence displacement of the liquid from the central layer was effected at low pressures which correlate to the large pores in the nonwoven fibre layer. The spun-bonded layer applied as an under-layer did not influence the test since the liquid which was displaced from the pores of the nonwoven fibre layer via gas pressure, simply flowed through the lower spun-bonded layer and the gas pressure was hence not suitable for displacing liquid from the under-layer. Hence the diameter and the volume of the pores in the nonwoven fibre layer were determined with this test.

The invention claimed is:

1. A filter bag for a vacuum cleaner made of a filter material, comprising:
at least three layers, at least two of the at least three layers comprising at least one nonwoven fabric layer and at least one nonwoven fibre layer, the at least two of the at least three layers containing at least one of (a) fibres and (b) filaments, the at least three layers being connected by a weld provided that a compressed surface area proportion of a weld pattern is at most 5% of a surface of a permeable surface area of the filter bag and, relative to the total permeable surface area of the filter bag, at most 19 welds per 10 $cm^2$ are present.

2. The filter bag according to claim 1, wherein an average total porosity is at least 65%.

3. The filter bag according to claim 1, wherein an average total porosity is at least 80%.

4. The filter bag according to claim 1, wherein an average total porosity is at least 95%.

5. The filter bag according to claim 1, wherein an average median of a pore diameter is at least 120 μm.

6. The filter bag according to claim 1, wherein an average median of a pore diameter is at least 150 μm.

7. The filter bag according to claim 1, wherein an average median of a pore diameter is at least 180 μm.

8. The filter bag according to claim 1, wherein an average median of a pore diameter is at least 200 μm.

9. The filter bag according to claim 1, wherein, relative to the permeable surface area, at most 10 welds per 10 $cm^2$ are present.

10. The filter bag according to claim 1, wherein at most 5 welds are present.

11. The filter bag according to claim 1, wherein the welds are distributed uniformly over the permeable surface of the filter bag.

12. The filter bag according to claim 1, wherein the welds are distributed non-uniformly over the permeable surface of the filter bag.

13. The filter bag according to claim 1, wherein the welds have at least one of a star-shaped, a punctiform, a bar-shaped, and a linear configuration.

14. The filter bag according to claim 1, wherein the compressed surface area proportion of the weld pattern is at most 2%.

15. The filter bag according to claim 1, wherein the compressed surface area proportion of the weld pattern is at most 1%.

16. The filter bag according to claim 1, wherein the staple fibres have a length between 1 and 100 mm.

17. The filter bag according to claim 1, wherein the staple fibres have a length between 3 to 70 mm.

18. The filter bag according to claim 1, wherein the staple fibre is at least one of a split fibre, crimped fibre and a further staple fibre.

19. The filter bag according to claim 18, wherein the crimped fibre has different spatial structures.

20. The filter bag according to claim 19, wherein the spatial structures include a zig-zag, an undulating, and a spiral type.

21. The filter bag according to claim 18, wherein the crimped fibre is at least one of a mechanically crimped fibre, an autocrimped fibre, and a bicomponent fibre.

22. The filter bag according to claim 1, wherein the staple fibre is an electrostatically charged staple fibre.

23. The filter bag according to claim 1, wherein the staple fibre is selected from at least one of natural fibres and chemical fibres.

24. The filter bag according to claim 1, wherein a mass surface density of the nonwoven fibre layer is between 10 and 200 g/$m^2$.

25. The filter bag according to claim 1, wherein a mass surface density of the nonwoven fibre layer is between 20 to 100 g/$m^2$.

26. The filter bag according to claim 1, wherein the nonwoven fabric layer has a mass surface density of at least 5 g/$m^2$.

27. The filter bag according to claim 26, wherein the nonwoven fabric layer is a scrim.

28. The filter bag according to claim 26, wherein the nonwoven fabric layer is one of a spun-bonded fabric and a melt-blown layer.

29. The filter bag according to claim 1, wherein the composite comprises two nonwoven fabric layers between which the nonwoven fibre layer is disposed.

30. The filter bag according to claim 1, wherein the composite comprises a nonwoven fabric layer and a fine filter spun-bonded layer between which the nonwoven fibre layer is disposed.

31. The filter bag according to claim 1, wherein the composite comprises at least one further fine filter spun-bonded layer.

32. The filter bag according to claim 1, wherein the fine filter spun-bonded layers have different filter properties.

33. The filter bag according to claim 1, wherein a fine filter spun-bonded layer is disposed on the outflow side.

34. The filter bag according to claim 1, wherein the further layers are formed from at least one of papers, nonwoven materials, and nanofibres.

35. The filter bag according to claim 1, wherein all the layers are connected by an ultrasonic weld.

36. The filter bag according to claim 1, wherein the arrangement of the welds create a cushion-like configuration.

37. Use of a filter bag as a vacuum cleaner bag, the filter bag including at least three layers, at least two of the at least three layers comprising at least one nonwoven fabric layer and at least one nonwoven fibre layer, the at least two of the at least three layers containing at least one of (a) fibres and (b) filaments, the at least three layers being connected by a weld provided that a compressed surface area proportion of a weld pattern is at most 5% of a surface of a permeable surface area of the filter bag and, relative to the total permeable surface area of the filter bag, at most 19 welds per 10 $cm^2$ are present.

* * * * *